United States Patent
Lindsay et al.

(10) Patent No.: US 8,662,134 B2
(45) Date of Patent: Mar. 4, 2014

(54) TIRE TREAD BUFFING APPARATUS AND METHOD

(71) Applicant: Bridgestone Bandag, LLC, Muscatine, IA (US)

(72) Inventors: John S. Lindsay, Muscatine, IA (US); Brian Paul Goschka, Muscatine, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 0 days.

(21) Appl. No.: 13/938,366

(22) Filed: Jul. 10, 2013

(65) Prior Publication Data

US 2013/0292063 A1    Nov. 7, 2013

Related U.S. Application Data

(62) Division of application No. 12/719,366, filed on Mar. 8, 2010, now Pat. No. 8,585,843.

(51) Int. Cl.
*B24B 51/00* (2006.01)
*B24B 49/02* (2006.01)
*B29D 30/54* (2006.01)

(52) U.S. Cl.
USPC .................................. 157/13; 451/5; 156/96

(58) Field of Classification Search
USPC ............ 156/95, 96, 98, 128.1, 153, 350, 351, 156/352, 353, 368, 523, 535; 157/13; 451/5, 920
See application file for complete search history.

(56) References Cited

U.S. PATENT DOCUMENTS

| | | | |
|---|---|---|---|
| 2,864,445 A | 12/1958 | Hawkinson |
| 2,985,231 A | 5/1961 | Roesch |
| 3,528,476 A | 9/1970 | Hawkinson, Jr. |
| 3,553,903 A | 1/1971 | Christie |
| 3,584,673 A | 6/1971 | Lehmann |
| 3,595,295 A | 7/1971 | Curry |
| 3,675,706 A | 7/1972 | Cahill |
| 3,972,362 A | 8/1976 | Pace |
| 3,980,120 A | 9/1976 | Fawcett et al. |
| 3,987,837 A | 10/1976 | Hopple et al. |

(Continued)

FOREIGN PATENT DOCUMENTS

| | | |
|---|---|---|
| EP | 1189014 A2 | 3/2002 |
| EP | 1825953 A1 | 8/2007 |

(Continued)

OTHER PUBLICATIONS

Ulrich Deubler, European Search Report and Written Opinion in EP Application No. 11753933.8, Jun. 28, 2013, 7 pp., European Patent Office.

(Continued)

*Primary Examiner* — Martin Rogers

(57) ABSTRACT

A system and method for removing an outer layer of resilient material from an object to achieve a target outer dimension includes performing an initial cut at a cutting depth to remove an outer layer of the material. A parameter indicative of a work input to a cutter that performed the cut is acquired and used to determine the cutting depth that will be used for performing a subsequent cut to remove an additional layer. In this way, subsequent cuts are performed until the target outer dimension is achieved.

8 Claims, 4 Drawing Sheets

(56) References Cited

U.S. PATENT DOCUMENTS

| | | |
|---|---|---|
| 4,116,256 A | 9/1978 | Morris et al. |
| 4,139,041 A | 2/1979 | Newton |
| 4,244,416 A | 1/1981 | Newton |
| 4,736,546 A | 4/1988 | Ugo |
| 4,914,869 A | 4/1990 | Bayonnet et al. |
| 5,238,041 A | 8/1993 | Tomita et al. |
| 5,263,284 A | 11/1993 | Wild |
| 5,307,854 A | 5/1994 | Brewer |
| 5,315,789 A | 5/1994 | Takashi |
| 5,846,882 A | 12/1998 | Birang |
| 6,015,105 A | 1/2000 | Brewer |
| 6,086,452 A | 7/2000 | Lipczynski et al. |
| 6,251,204 B1 | 6/2001 | Andersson et al. |
| 6,386,945 B1 | 5/2002 | Fahringer et al. |
| 6,745,809 B1 | 6/2004 | Mory et al. |
| 7,040,371 B2 * | 5/2006 | Mory et al. .............. 157/13 |
| 2005/0211351 A1 | 9/2005 | Majumdar et al. |
| 2009/0156097 A1 | 6/2009 | Pilkington |

FOREIGN PATENT DOCUMENTS

| | | |
|---|---|---|
| EP | 1955843 A1 | 8/2008 |
| JP | 09-132013 | 5/1997 |
| JP | 2002-144208 A | 5/2002 |
| KR | 10-0572366 B1 | 4/2006 |
| WO | WO 2008/121141 A1 | 10/2008 |

OTHER PUBLICATIONS

Bandy et al., "A Methodology for Compensating Errors Detected by Process-Intermittent Inspection," National Institute of Standards and Technology International Report, 2001, pp. 1-77.

Park Young Keun, International Search Report and Written Opinion in International Application No. PCT/US2011/027562, Nov. 14, 2011, 9 pp., Korean Intellectual Property Office, Daejeon, Republic of Korea.

* cited by examiner

TIRE TREAD BUFFING APPARATUS AND METHOD

CROSS-REFERENCE TO RELATED APPLICATIONS

This patent application is a divisional of copending U.S. patent application Ser. No. 12/719,366, filed Mar. 8, 2010, which is incorporated herein by reference.

BACKGROUND OF THE INVENTION

The invention relates generally to a method and apparatus for making retreaded tires and, more particularly, to a method and apparatus in which the existing tread and material of a tire casing is removed to provide a tire casing having a desired circumference (or radius) onto which a new tread may be installed.

Retreaded tires provide an economical way to gain additional use from tire casings after the original tread or retread has become worn. According to a conventional method of retreading, sometimes referred to as cold process retreading, worn tire tread and other materials on a used tire are removed to create a buffed, generally smooth, treadless surface along the circumference of the tire casing to which a new layer of tread may be bonded.

The tire casing is then typically inspected for injuries, some of which may be skived and filled with a repair gum while others may be severe enough to warrant rejection of the tire casing. After completion of the skiving process, the buffed surface may be sprayed with a tire cement that provides a tacky surface for application of bonding material and new tread. Next, a layer of cushion gum may be applied to the back, i.e., the inside surface of a new layer of tread, or alternatively, the layer of cushion gum may be applied directly to the tacky surface on the tire casing. There are other known methods that may eliminate the need for cement or cushion gum. Conventionally, the cushion gum is a layer of uncured rubber material. The cushion gum and tread may be applied in combination about the circumference of the tire casing to create a retreaded tire assembly for curing. As an alternative, a length of tire tread may be wrapped around the tire casing with the cushion gum already applied. The cushion gum may form the bond between the tread and the tire casing during curing.

Conventionally, the buffing of the tire casing is controlled and manipulated by a human operator of a buffing machine. The buffing machine includes a rasp that can be applied to the surface of the tire to remove rubber. Because the circumference of a tire casing can more easily be measured by the operator, the desired final radius of the tire casing is typically identified in relation to the final circumference of the tire casing. It will be understood that circumferential measurements in this application are equivalent to radial/diameter measurements in that they are related by $\pi$. As the final desired circumference approaches, the operator may take a measuring device (e.g. a tape measure) and wrap it around the circumference of the casing to obtain a measurement and guess at the depth of each subsequent cut. This imprecise and error ridden process is time consuming and often results in a tire casing with a radius or circumference that does not substantially meet the final desired circumference.

One manner to reach the final circumference is to move the rasp into the desired position matching the final desired radius (or circumference) and keep repeating passes over the casing until there is no rubber being removed. This is very inefficient and unsatisfactory, and is thus not typically practiced.

There are a multitude of problems that may result from the imprecision of uncontrolled buffing of the tire as is typically practiced through the operator guessing the depth of final cuts or intentionally permitting imprecision. The treads on the tires are sometimes in the order of an inch or so in depth. On certain vehicles, two tires may be mounted next to each other on the same axle. If the radius of the tires is not substantially the same, a condition commonly referred to as scrubbing may occur. Such condition may derive from the radius of each final tire being different and, consequently, the velocity at the outer surface of the tire having a larger radius will tend to be larger than that of the tire having the smaller radius. The difference in velocity, given that the tires are mounted on the same axis, can generate friction in the tires at their outer surfaces, which tends to wear or scrub material from the tires in undesirable manners.

Another problem, among many others, generated by imprecision in arriving to the final circumference of a tire casing is that the tread to be applied may not match the casing, e.g., it may be too short or too long. In some instances, the tire tread is pre-cut to length before the tire casing is prepared while in other cases, the tread needs to be cut so that the tread pattern is continuous over the splice. In such instances, the predetermined length of the tire tread is expected to match the circumference of the buffed tire casing. When the circumference of the tire casing does not correlate properly with the predetermined length of the tread, which can occur through variability in the final outer circumference of the buffed tire casing, the tread will not match. In any event, the failure to substantially match final circumference of the tire casing to the target circumference of the tire casing and the predetermined length of the tread to be bonded to the tire casing can result in undesirable performance deficiencies.

A further undesirable problem with prior tire buffing has been that there can be delays and time inefficiencies as the operators attempt to experiment with the placement and operation of the rasp as rubber is being removed from the tire. Such time inefficiency and placement errors again result in undesirable performance deficiencies.

All of the noted problems and undesirable deficiencies are exacerbated further by the variability in the condition of incoming worn tires (or tire casings) that are commonly experienced. Incoming worn tires or tire casings often have rubber that is of differing characteristics depending on the environmental conditions to which they have been subjected in service. For example, tire casings that have been subjected to sustained heat might be more brittle than other tire casings that are younger and have not been subjected to heat. Some tire casings might have been stored for long periods in warehouses. Such and other historical circumstances of the incoming tire casings result in a significantly variable rubber product. Consequently, each buffing operation for different tires proceeds with different efficiencies and characteristics. Such differences further contribute to the final casing being variable and resulting in the noted problems.

BRIEF SUMMARY OF THE DISCLOSURE AND EXAMPLE EMBODIMENTS

The invention provides an apparatus and method for processing tire casings, which are at an unknown and/or inconsistent material condition, to produce buffed tire casings having an outer circumference that is appropriately sized for subsequent retreading operations. The apparatus and methods described herein provide for automated buffing of a tire casing which is more expedient, consistent, and accurate.

It has been discovered that the final circumference (or radius) of a tire casing may be obtained through automated buffing that adjusts, in substantially real time, for variations that may occur as tire casings of varying conditions are processed. The apparatus and method provide for monitoring electrical signals that are indicative of the processing conditions of the tire casing as buffing proceeds. The electrical signals are then correlated to an offset to facilitate improved cutting and buffing to consistently and substantially reach a target outer circumference or radius, which is a significant improvement over prior processes that were inefficient and inaccurate.

When processing a tire casing to remove rubber, it has been discovered that a rasp (which refers herein to any rubber removing device, e.g. rasp, cutter, etc.) locally deforms the tire to the cutting depth of the rasp around the contact area. The conditions of the rubber and the deformation contribute to a cut that often does not remove all of the rubber engaged by the cutter at the cutting dept in a single pass, but leaves behind a certain amount of rubber that depends on processing and tire conditions. The remaining rubber may accumulate (or become stored rubber) as repetitive passes are made at iterative cutting depths, especially if the passes are incrementally deeper in equal in-feed rates in the radial direction. In other words, as may be the case, a rasp may be moved inwardly in equal increments to a target circumference or radius after each pass. There are many patterns of passes that may be made including ones where the rasp is applied in locations starting at one side of the tire and moving to the other side of the tire, thereby making an arced pass across the tire. As the rubber accumulates with each pass, the difference between the outer circumference of the tire and the position of the rasp increases.

By monitoring electrical signals indicative of the processing of the tire and analyzing such signals, the amount of offset between the resulting diameter and the position of the rasp may be determined as the final pass occurs or approaches. With such information, the final pass may be adjusted so that the position of the rasp is set based on the calculated resulting outer circumference. In many cases, especially where there is an accumulation of stored rubber, the radial position of the rasp will be closer to the central axis of rotation than the target outer circumference or radius would otherwise indicate. This provides for better control over obtaining the final outer circumference and permits for better precision resulting in a casing that substantially meets the target circumference or radius of the casing.

In certain embodiments of the invention, the electrical signals that are monitored are electrical signals relating to the motors driving either or both of the rasp and tire. The power or work drawn by such devices is related to the amount of rubber material that is being accumulated or stored through each pass in a cumulative manner. Through such signals, the positioning of the rasp in the final passes may be adjusted so that the resulting circumference or radius of the tire casing is reached in a more efficient manner.

DETAILED DESCRIPTION OF THE INVENTION AND EXAMPLE EMBODIMENTS

Figure 1:
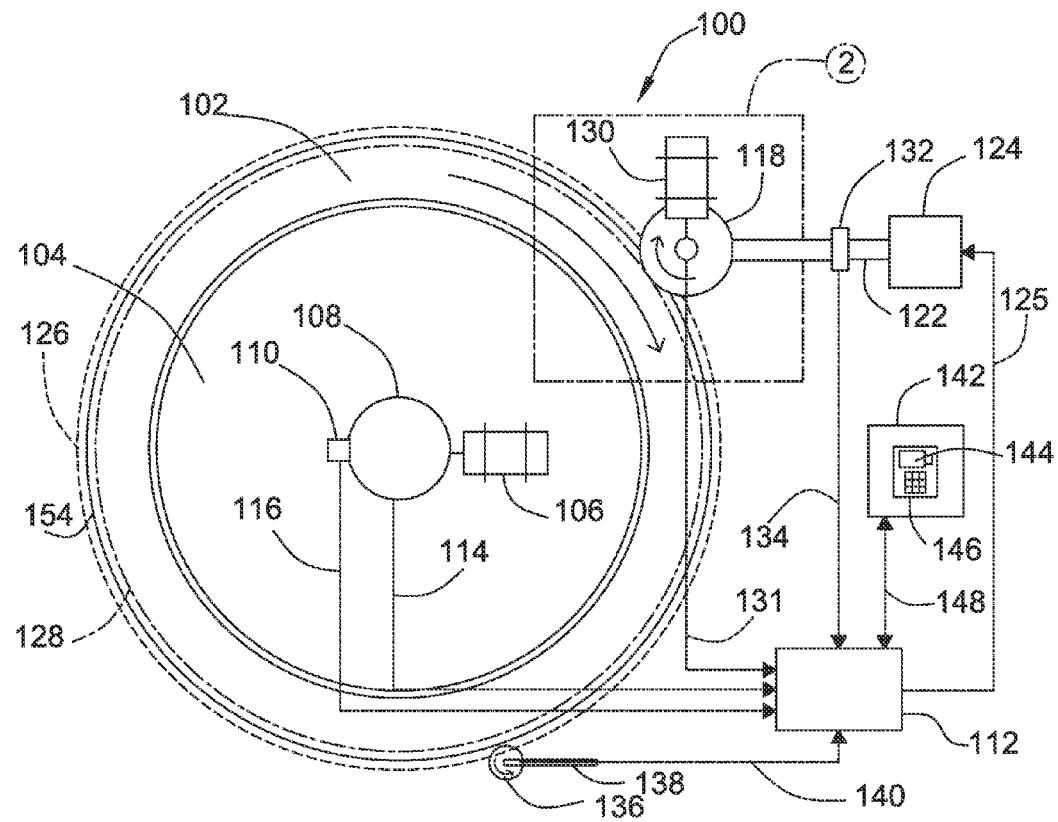
FIG. 1 is a schematic view of a tire buffing system in accordance with the disclosure.

A buffing machine 100 having a tire 102 mounted on a rotating rim 104 is shown schematically in FIG. 1. As shown, the machine 100 may be a standalone, dedicated machine for buffing tires prior to a retreading operation, or may alternatively be part of a retreading machine that can perform other operations, such as installing a new tread onto the casing.

In the illustrated example embodiment, the rim 104 and tire 102 rotate at a constant angular rate of rotation during operation, for example, 60-90 revolutions per minute (RPM), but may also rotate at a variable speed. An electric motor 106 is connected to a hub 108 of the rim 104 to provide the rotation of the tire 102, but any other type of rotary actuator may be used, such as hydraulically or pneumatically powered motors, or even mechanical arrangements providing a rotating output. As shown, the hub 108 includes timing features that are picked up by an angular displacement encoder 110 associated with the machine 100. A control signal of the motor 106 may be provided by an electronic controller 112 via a motor control conduit 114, while information indicative of the rotation of the hub 108 may be provided to the controller 112 by the encoder 110 via a tire rotation information conduit 116.

The machine 100 further includes a buffing tool or rasp 118. The rasp 118 may be any device capable of cutting material from the rotating tire 102. In an illustrated example embodiment, the rasp 118, which is shown in more detail in FIG. 2, includes a laminated steel drum having saw teeth 120 arranged around its outer cylindrical surface. The illustrated example rasp 118 has a length of about 4 inches (10.2 cm) and a diameter of about 8 inches (20.4 cm).

Figure 2:
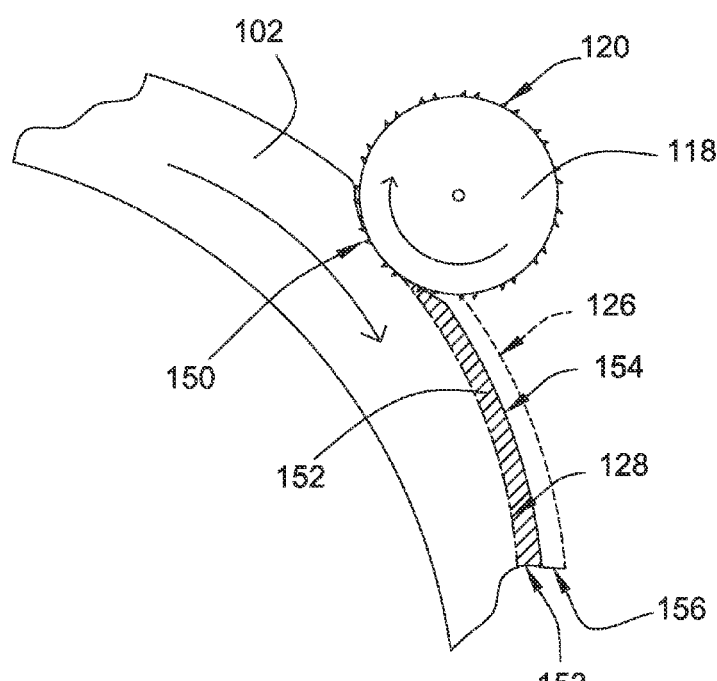
FIG. 2 is a detail view of the buffing system of FIG. 1.

Although many configurations are possible, the rasp 118 is connected to the machine 100 at the end of an arm 122. The position of the arm 122 and of the rasp 118 relative to the tire 102 can be adjusted by a rasp actuator 124. The rasp actuator positions the rasp head to sweep a circular arc across the face of the tire at a defined radius. A force thus derived is caused by the interference between the rasp face and the circumference of the tire being buffed. There are other arrangements of the arm, actuator, and other parts of the cutting assembly that are known in the art and incorporated herein. This pressing or normal force effects removal of material from the tire 102 and is carried out in response to command signals provided by the electronic controller 112 via a rasp actuator control conduit 125. As best shown in FIG. 2, the outer circumference 126 is illustrated by dashed line. In that same figure, the cutting depth 128, which is located radially inward from the outer circumference 126 relative to a center of the tire 102, is shown in dash-dot-dashed line.

During a cutting operation, the rasp 118 is driven by a rasp motor 130 in a counter-rotational direction relative to the tire 102. The motor 130 is controlled and monitored by the electronic controller 112 through a motor control conduit 131. When the rasp 118 is in position at the cutting depth 128 and the motor 130 is operating, material is removed from the outer portion of the tire 102 as the teeth 120 of the rasp 118 are pressed against the outer circumference 126.

Information indicative of the cutting depth 128 is provided to the electronic controller 112 by a position sensor 132. In the illustrated example embodiment, the position sensor 132 is associated with the arm 122 to provide information indicative of the absolute radial position of the rasp 118 relative to the centerpoint of the hub 108, but other arrangements may be used, such arrangements being known to practitioners in the art. Information from the position sensor 132 is provided to the electronic controller 112 via a rasp position information conduit 134. In one embodiment, measurements of the casing circumference are provided to the electronic controller 112 by a measurement wheel 136. The measurement wheel 136 of the illustrated example embodiment is associated with an encoder 138 that is connected to the electronic controller 112 via a measurement information conduit 140. The measurement wheel 136 is free rotating and, when it is placed in contact with outer circumference of the tire 102, rotates such that the encoder 138 can provide information indicative of the outer circumference of the tire 102 when the tire performs a full rotation. In an alternative embodiment, the encoder 138 may be associated with the rasp 118 and provide a measurement to the electronic controller 112 by placement of the rasp 118, which in this instance is unpowered and free to rotate, in contact with the tire 102.

The machine 100 may further include other components and systems. For example, the machine 100 may include computer networking components and systems (not shown) enabling its control from a remote or otherwise central location. In the illustrated example embodiment, the machine 100 includes an operator interface 142 that enables local operation of the machine 100. The operator interface 142 includes a display 144 and a keypad 146 that can be used during operation to display the status of the buffing process as well as to input information into the electronic controller, such as the type of tire being processed, the desired circumferential dimension sought to be achieved, and others. The two-way communication of information between the electronic controller 112 and the operator interface 142 is conducted via an operator information conduit 148.

During a cutting pass, the rasp 118 is set to the cutting depth 128 and resiliently compresses the material of the tire in the region of contact 150 between the rasp 118 and the outer circumference 126. The compression pushes the material along the outer portion of the casing against the teeth 120 of the rasp 118. This compressive force is not constant, but rather changes depending on the angular location along the region of contact 150 relative to the centerpoint of the rasp. The force reaches its maximum magnitude along a line connecting the center points of the rasp 118 and the tire 102. Although the teeth 120 are able to rip material away from the tire 102, the amount of material thus removed depends on various parameters and factors, such as the resiliency of the rubber, the sharpness of the teeth, the aggressiveness of the cut depth, the rate of rotation of the tire and rasp, and others.

As shown in FIG. 2, the rasp 118 does not remove the entire layer of material disposed between the outer circumference 126 and the cutting depth 128 in a single pass, which leaves a layer of stored material 152 having a thickness 153 on the outer portion of the tire 102. After each pass of the rasp 118, the new outer circumference 154 of the tire 102 will be radially located between the previous outer circumference 126 and the cutting depth 128. The radial distance of the cutting depth 128, which is augmented by the thickness 153 of the stored layer 152 in the radial direction, will determine the radial location of the new outer circumference 154 of the tire 102. The layer of material that was removed from the tire 102 has a thickness 156 in the radial direction.

The ratio of the thickness of the layer of removed material 156 relative to that of stored material 153 for a given cutting depth 128 depends on a multitude of parameters, such as the temperature and aging of the tire material, the shape, arrangement, and sharpness of the teeth 120, the rotational speed of the rasp relative to the tire, the distribution of rubber across the width of the tread (for tires worn unevenly), and others. The amount of offset or stored material may be monitored based on correlations of work expended during the cutting operation. The correlations can be determined empirically, for example, based on running a group of tires through the process and then collecting the actual outer circumference as electrical signals are monitored. Depending on the particular setup of the machine, such empirical data may vary. Therefore, in the context of this invention, the best method of providing such data is to also perform certain machine setup tasks for each particular machine in the manner described herein.

The estimation of the thickness 153 of the stored material layer 152 may be further corrected for machine specific factors, such as the length of service of the rasp. When implemented in the machine 100, the correlations can be distilled into individual equations or equation sets that include experimentally-determined factors applied to variables measured from the system using various sensors.

Figure 3:
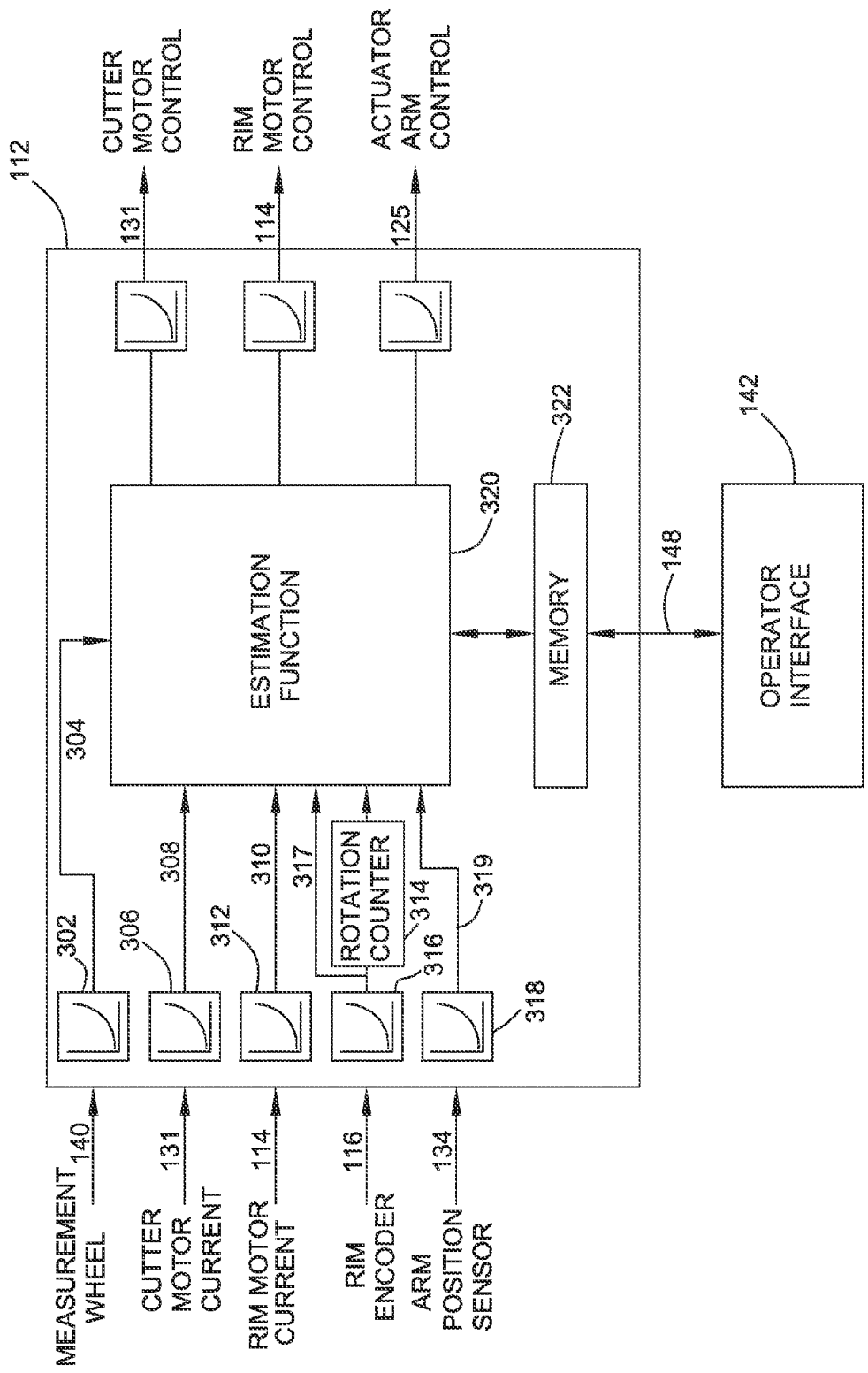
FIG. 3 is a functional diagram of a controller in accordance with the disclosure.

In accordance with the foregoing, a block diagram of the electronic controller 112 is shown in FIG. 3. The electronic controller may be a single controller or may include more than one controller disposed to control various functions and/or features of a machine. For example, a master controller, used to control the overall operation and function of the machine, may be cooperatively implemented with one or more motor controllers. In this embodiment, the term "controller" is meant to include one, two, or more controllers that may be associated with the machine 100 and that may cooperate in controlling various functions and operations of the machine 100 (FIG. 1). The controller's operation is shown in FIG. 3 to include various discrete operations for illustrative purposes only, may be implemented in hardware and/or software without regard to the discrete operations shown. Accordingly, various interfaces of the controller are described relative to components of the buffing machine 100 (FIG. 1) shown in the block diagram of FIG. 3. Such interfaces are not intended to limit the type and number of components that are connected, nor the number of controllers that are described.

As shown, and in ongoing reference to the components shown in FIG. 1, the electronic controller 112 is disposed to receive various inputs from the various sensors of the machine 100. In this way, the measurement information conduit 140 providing information indicative of the measured circumference of the tire is connected to a transfer function 302 that provides an initial or current circumference (CC) 304 of the tire 102. In a similar fashion, the rasp motor control conduit 131 is connected to a transfer function 306 that provides an average rasp current (ARC) 308, which is indicative of the power consumed by the rasp 118 (FIG. 1) during operation. The average rasp current (ARC) 308 may be monitored during the performance of a cut as well as when the rasp is idle. A value indicative of the current 310 drawn by the electric motor 106 driving the rim 104 is provided by a transfer function 312, which receives information from the rim motor control conduit 114.

The controller 112 is further disposed to receive information indicative of the rotational position of the rim 104 by a signal received via the rim position information conduit 116 from the rim encoder 110. In the illustrated example embodiment, the rim encoder 110 is a hall effect sensor, but any other appropriate type of contacting or non-contacting sensors may be used. The rotational position 317 of the rim 104 is provided to a rotation counter 314 via a transfer function 316. Finally, in the example embodiment illustrated, the controller 112 is disposed to receive a signal indicative of the actual position of the rasp 118 relative to the rim 104. The position of the rasp 118, which is indicative of the cutting depth, is provided as a signal from the arm position sensor 132. The arm position sensor 132 is connected to the controller 112 via the arm position information conduit 134, which provides information indicative of the actual cutting depth 319 of the rasp 118 via a transfer function 318.

Information provided by various sensors of the machine is used by the electronic controller 112 to calculate or otherwise determine the number of cuts, as well as the appropriate cutting depth for each of those cuts on the tread portion of the tire 102 that will yield a casing having a desired target circumference. These determinations are essentially based on the calculation or estimation of the amount of material stored in the tire 102 after each cut. In the illustrated example embodiment, the calculation or estimation of the material stored is based on an estimation of the material removed by each cut, and on the cutting depth used for that cut. The calculation or estimation of the material stored or removed by each cut, which can be used to determine subsequent cuts and subsequent cutting depths, as is described in more detail below, is performed in estimation function 320.

The estimation function 320 is arranged to receive and process information indicative of various functional parameters of the machine 100. In the illustrated example embodiment, the estimation function 320 receives required and optional signal inputs. Thus, the circumference value 304, the current consumption of the rasp and rim motors 308 and 310, the rotational position of the rim 317, the rotational count 314 of the rim, and the actual cutting depth of the rasp 319, are provided to the estimation function 320. Certain of these values, such as the power consumption of the rasp motor, have a direct correlation to the amount of material removed by each cut, while other values, such as the current consumption of the rim motor or tire drive motor (TDC) 310, are optional, but may be similarly indicative. Such and other optional values may improve the accuracy of the estimation of the amount of material stored on the tire during processing and/or improve the robustness of the system under changing conditions, but can be omitted and still maintain acceptable system performance. In the illustrated example system, the estimation function 320 is arranged to calculate or determine the number of cuts and the cutting depth of each cut that will produce a tire casing at a desired circumference.

In the illustrated example embodiment, the estimation function 320 has access to process-specific constants or parameters, which are stored and retrieved from a memory device 322. The memory device 322 may be any appropriate type of electronic information storage and retrieval device. The electronic information stored and retrieved in the memory device 322 may include a library of processing information, equation factors, desired circumference values, historical information indicative of the wear of the rasp and other machine components, and other information. Moreover, the memory device 322 can contain information relevant to on a particular type of tire being processed, as well as other information relevant to machine components, such as the used or remaining life of the rasp teeth, statistical information on the number of cycles performed by the machine, productivity data such as the average cycle time of the machine, tracking information on the specific tires processed by the machine, log data relative to each tire, and so forth. Such specific information is collected by repetitive processing of the tires and varies based upon the exact type of machine being employed to practice the disclosed method and apparatus. Specific information on each tire mounted to the machine, as well as retrieval of information from the memory device 322, may be accomplished by an appropriate connection to a computer and/or connection to the operator interface 142. Thus, an operator may place the machine into an appropriate operating mode after a tire has been mounted in the machine by simply selecting the type of tire that is mounted before initiating the processing operation. During the operation, the operator may monitor the machine's progress until the process is complete, and additionally use the display to verify that the buffed casing has a circumference that substantially matches the target circumference for the tire casing being processed.

Figure 4:
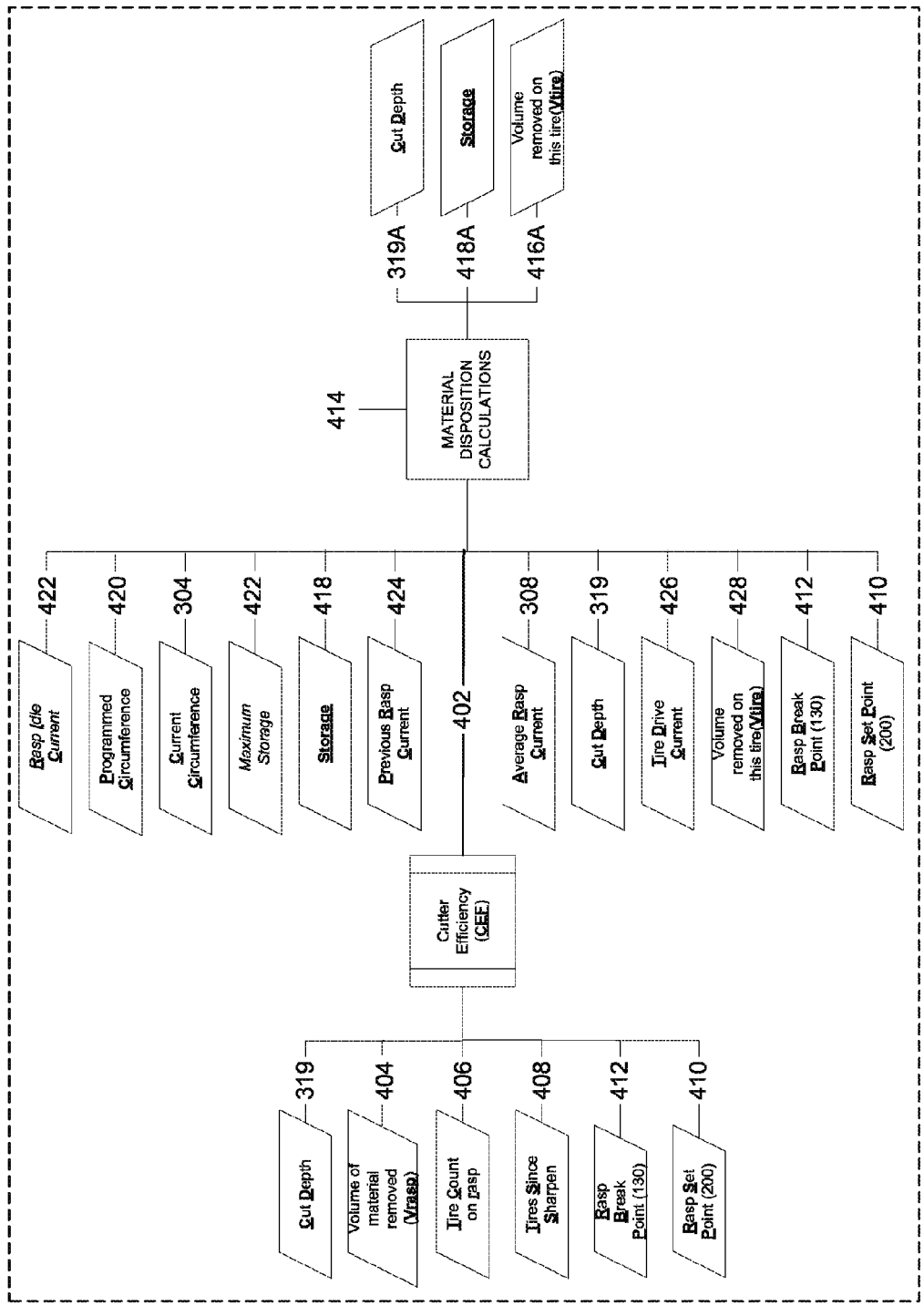
FIG. 4 is a functional diagram of a material storage estimation function in accordance with the disclosure.

A flow diagram showing the various variables used for the calculations and processing occurring within the estimation function 320 is shown in FIG. 4. The variables illustrated include external variables that are provided to the system, variables developed internally to the system based on the external inputs and other parameters, as well as constants that are provided to the system during initial setup such as historical values and other constants, as is provided in more detail below. These variables and constants are used to perform calculations that generate parameters used to control the operation of the buffing machine during the cutting operation. Although a specific set of variables is discussed herein, and specific implementations for achieving the contemplated function are presented, other implementations are possible that can achieve the same or similar results as those disclosed in the illustrated example embodiment.

The estimation function 320 includes a calculation of the efficiency of the cutter (CEF) 402, which represents the ability of the cutter to efficiently remove material from the outer portion of the tire. The calculation of CEF 402 may be based on experimental performance tests of rasps operating at various wear conditions. In the illustrated example embodiment, the calculation of CEF 402 is based on the cut depth (CD) 319 of the previous pass, which is provided externally, and on the volume of material removed over the life of the rasp (Vrasp) 404, which is calculated internally, and on historical data provided by the memory device 322 (FIG. 3). The historical data provided by the memory device 322 may include information on the number of processing cycles that a particular rasp has undergone, the number of tires processed over the life of a particular rasp 406, and/or a number of tires processed since the rasp was sharpened 408, all of which are retrieved from the memory device 322.

In the illustrated example embodiment, the rasp actuator is capable of aggressively driving the rasp motor beyond its maximum normal driving capacity, thus achieving a more aggressive cut. This function can optionally be accomplished by use of a dynamically controlled drive feature applied to the rasp actuator, the operation of which is controlled based on rasp current and loading set points, for example, a rasp set point (RSP) 410 and a rasp break point (RBP) 412. Both these parameters can be expressed as a percentage of the rasp rated motor current. The set point 410 determines the maximum end of overload that is acceptable, and the break point 412 represents a motor overload beyond which driving of the rasp actuator is scaled down, for example, to 5% of its programmed speed when the rasp current reaches the RSP, to avoid damage to the motor. These two overdrive parameters can be combined, for example, in a model, to provide the CEF 402, which is used in other calculations.

The CEF 402 is combined with other variables in a set of material disposition calculations 414, which are shown collectively in a single functional block. The material disposition calculations 414 comprise various calculations or other processes that determine by any appropriate method various parameters, such as the amount of material that was removed from the tire (Vtire) 416A by a previous pass of the rasp, the amount of material stored on the tire (Storage) 418A by the previous pass of the rasp, the cut depth (CD) 319A that should be used in a subsequent pass, and others. These determinations may be performed using numerical manipulations, system modeling equations, interpolation of data based on tabulated information, and other types of data processing and determination.

In one example embodiment, the material disposition calculations 414 are based on a correlation between the energy input to the system as it relates to the amount of material removed from the tire by the buffing process. In the machine illustrated in FIG. 1, for example, energy is input to the tire buffing system through the power consumed by the rasp motor and/or the rim motor. Insofar as the energy or power input to the system can be determined by monitoring the electrical current input to either or both of these motors, a correlation to the material removed from the tire during each cut can be experimentally determined. Thereafter, by determining the amount of material removed, in conjunction with information indicating the depth of each cut performed, the amount of material stored onto the tire can be determined by a correlation of the stored material amount to the energy or power input to the system. It will be appreciated that voltage and other electrical signals may be monitored to accumulate information that is indicative of the same thing.

In that same embodiment, an algebraic relationship may be defined between the current input to, for example, the rasp motor, and the material storage on the tire. Such algebraic relationship may take on any form that approximates the dynamic behavior of the tire buffing process, such as linear, exponential, or any other appropriate approximation. One example of such a linear form of the algebraic relationship, which was successfully tested on the machine 100 (FIG. 1) to remove the tread portion of a tire, is shown in Equation 1 below:

$$(\text{Storage Change}) = 1.2878 * ARC - 65 + (\text{Storage Adjustment}) \quad \text{Equation 1}$$

where "Storage Change" represents an amount of material removed from the tire, "ARC" represents the average current input to the rasp motor, and "Storage Adjustment" represents 65% of the Storage Change calculated in a previous cut. The stored material amount in a previous cut is thus compounded with the storage of material in a subsequent cut. Although the experiment was successful in yielding reasonable results in calculating the amount of material removed from the tire with each pass, the linear relationship that was used as represented in Equation 1 can be improved by changing its form to add additional variables that have been found to compensate for other physical and machine parameters present during the cutting process. In this way, the accuracy of the estimation of the amount of material stored on the tire can be improved.

Turning now to the example embodiment shown in FIG. 4, a more developed form of the equation is illustrated. In this embodiment, additional variables that compensate for various other factors affecting the accuracy of the estimation of the amount of material stored on the tire are included, which are represented by the input variables to the material disposition calculations 414. As shown, a desired or programmed target circumference (PC) 420, a maximum expected material storage value 422, which is a threshold value representing the worst-case storage condition expected, and a previous value of the rasp current (PRC) 424, are provided from the memory device 322 (FIG. 3) to the material disposition calculation block 414 as internal variables. Calculated parameters are also provided as internal variables, such as a material storage condition existing after the last pass of the rasp was performed (Storage) 418, as well as the total volume or amount of material that has been removed at any given time from the tire being processed (Vtire) 428, both of which are calculated and their values updated in real time, are provided as internal variables. External variables include the rasp motor current 308, which is acquired and stored when the rasp is not cutting and expressed as a rasp idle current (RIC) 422, the average rasp current (ARC) 308 that is acquired during a cutting operation, and the tire drive or rim drive current (TDC) 426.

It should be appreciated that the material estimation function 320 continuously processes various parameters, and updates the three output parameters of the material disposition calculations 414 at each processing cycle of the electronic controller 112. In one embodiment, various calculations are repeated for each cutting cycle. A sample calculation for determining the change in storage material after each cutting pass of the rasp, which is conducted while the current circumference (CC) 304 is greater than the target or programmed circumference (PC) 420, is provided in Equation 2 below. Equation 2 as shown below represents the tire buffing process that is modeled for an estimation of the amount of material stored with each cutting pass of the rasp:

$$\text{Storage Change} = (CEF) * (A*URC + B*e^{\hat{}}(-b*URC) + C*e^{\hat{}}(c*URC) + D*e^{\hat{}}(d*Vtire) + F*e^{\hat{}}(f*Vtire) + G*e^{\hat{}}(g*RBP) + H*e^{\hat{}}(h*RBP) + (I*e^{\hat{}}(i*RBP) + J*e^{\hat{}}(j*RSP) + K*e^{\hat{}}(k*RSP) + M*e^{\hat{}}(m*RSP) + N*e^{\hat{}}(n*PRC) + O*e^{\hat{}}(o*CD) + R*e^{\hat{}}(r*CD)) \quad \text{Equation 2}$$

where "A" through "R" and "b" through "r" are factors that are experimentally determined, and where the system variables used in the equation, as those variables are shown and previously described above relative to FIG. 4, are provided in Table 1 below:

TABLE 1

| Variable | Parameter | Type |
| --- | --- | --- |
| CEF | Cutter Efficiency | Calculated |
| URC | Useful Rasp Current | Calculated |
| Vtire | Volume of material removed from tire being processed | Calculated, set to 0 at initiation of process |
| RBP | Rasp Break Point | Constant (%) |
| RSP | Rasp Set Point | Constant (%) |
| PRC | Previous Rasp Current | Historical/variable |
| CD | Cut Depth | Historical/variable |

It should be appreciated that fewer, more, or different variables than the those shown in Equation 2 may be used to model the tire buffing process. For example, terms containing the tire drive current (TDC) 310 can be added to the equation as compensation for energy losses in the buffing system. Such additional terms may also be used to perform sanity checking of the values provided by the various sensors, for example, the current draw of the rasp motor, and/or for setting limits to the variables used in the calculations.

In Equation 2 above, the cut depth (CD) for each cutting pass of the rasp is selected by the system as the lesser of either a programmed or predetermined cut depth (PCD), which is a predetermined incremental cutting depth, for example, 0.069 inches (1.75 mm), or a cut depth determined as a function of the current circumference of the tire (CC), the target or programmed circumference (PC), and the amount of material storage on the tire, as provided in Equation 3 below:

$$CD = \text{Min}[PCD, (CC - PC - \text{Storage})/2*\pi)] \quad \text{Equation 3}$$

Further, the useful rasp current appearing in Equation 2 above is a calculated parameter that is determined based on the average rasp current (ARC) acquired by the system, minus the rasp current at idle (RIC), as provided in Equation 4 below:

$$URC = ARC - RIC \qquad \text{Equation 4}$$

In the illustrated example embodiment, the idle current of the rasp motor (RIC) when no cutting is taking place is measured at each machine startup and stored in the memory 322 (FIG. 3) as a constant value while the machine is operating.

The volume of material removed from a tire being processed (Vtire), as well as the volume of material removed during the life of the particular rasp being employed (Vrasp), are incremented when material is removed during each cutting pass of the rasp. These calculations are similar and are shown in, respectively, Equations 5 and 6 below:

$$V\text{tire}_{n+1} = V\text{tire}_n + (CD * Tread\_Width * CC) \qquad \text{Equation 5}$$

$$V\text{rasp}_{n+1} = V\text{rasp}_n + (CD * Tread\_Width * CC) \qquad \text{Equation 6}$$

where "$V\text{rasp}_{n+1}$" and "$V\text{rasp}_n$" are incrementally increased estimations of the volume of material removed by a last cutting pass of the rasp over the tire, "$V\text{rasp}_{n+1}$" and "$V\text{rasp}_n$" are the corresponding values of volume of material removed by the cutting pass immediately preceding the last cutting pass, "CD" and "CC" are, respectively, the cutting depth and current circumference of the tire as previously described, and "Tread_Width" is a constant that is equal to the width of the tread of the particular type of tire being processed. The width of the tread as well as other tire-specific parameters can be entered by the operator and/or retrieved from the memory device 322 (FIG. 3) before each cutting operation as was previously described.

Having described the calculations and processes for determining the incremental change in volume or amount of material stored onto the tire by each cutting pass of the rasp, a total amount of material stored on the tire (Storage) can be determined as a non-negative integral value of all incremental storage changes accumulated on the tire being processed, as provided in Equation 7 below:

$$\text{Storage}_{n-1} = \text{Min}[\text{Max\_Storage}, \text{Max}(0, \text{Storage}_n + \text{Storage Change}_{n+1})] \qquad \text{Equation 7}$$

where "n+1" refers to the last cutting pass performed on the tire, "n" refers to the cut preceding the last cut, and "Max_Storage" is a constant representing the maximum storage volume or amount of material that can accumulate on any particular tire type in a single cut. This parameter can be retrieved from the memory device 322 (FIG. 3) and can be determined experimentally by, for example, performing a sample cut on a tire using a rasp that has worn to the end of its useful service. Having determined the amount of Storage, the cutting depth for a subsequent cut is determined as provided in Equation 3 above for each cutting pass.

Figure 5:
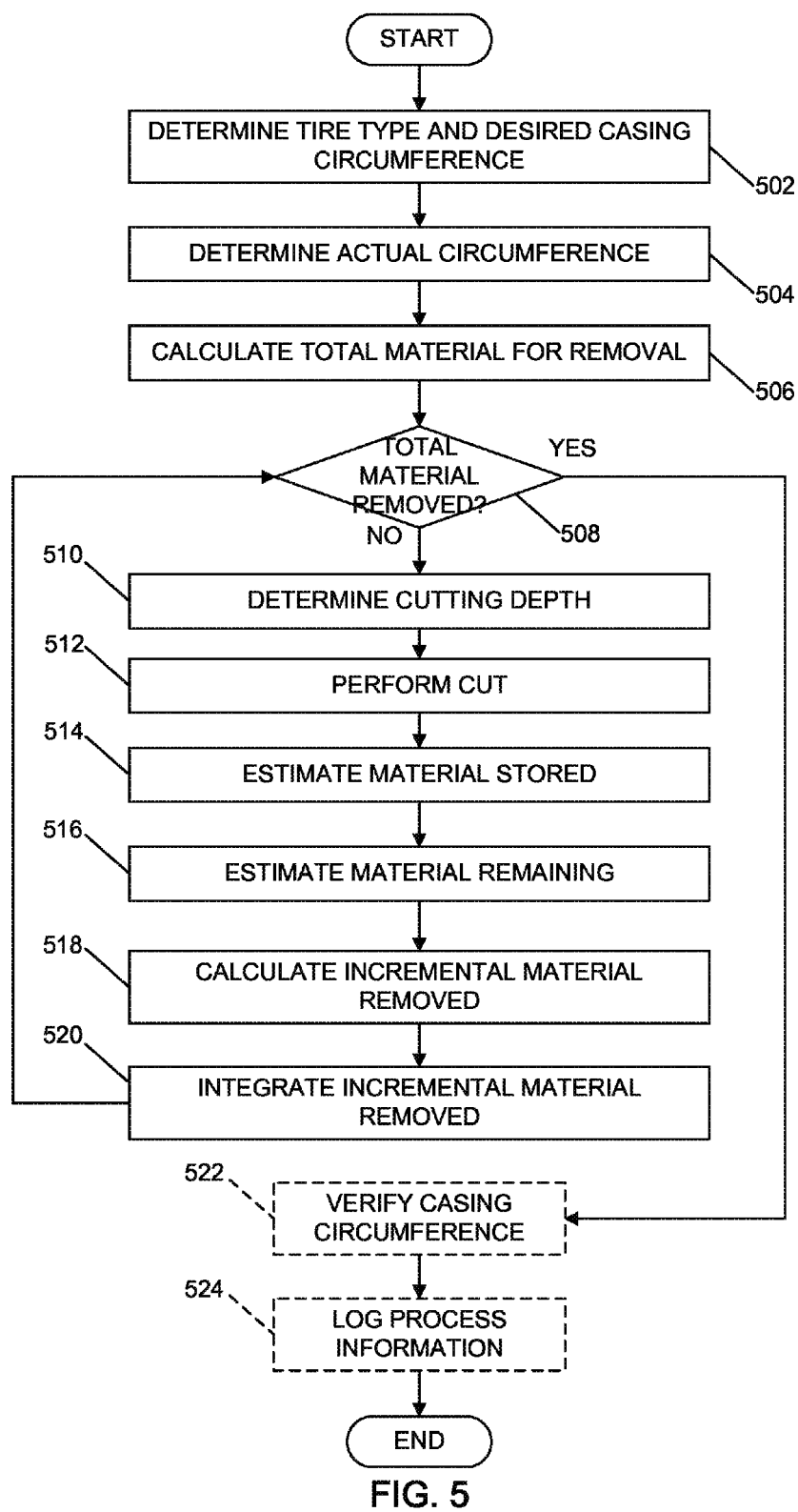
FIG. 5 is a flowchart for a method in accordance with the disclosure.

In another example aspect, the disclosure provides a method for buffing casings to a correct target dimension. A flowchart for a method of preparing a tire for application of new tread by removing the existing tread, a process commonly referred to as buffing, is shown in FIG. 5. The method may be part of a tire processing system, which includes a machine operating in concert with an electronic controller, or may be a standalone process. The machine, along with any controllers that may be integrated or cooperating remotely therewith, are collectively referred to in the discussion that follows as a tire processing system, system, or process, for simplicity.

In reference to FIG. 5, the process includes an optional determination of the type or model of tire to be processed at 502. This information may be automatically acquired by an electronic system, for example, by scanning a barcode on the tire or on a label previously placed on the tire, or it may alternatively be manually input into the system by an operator. This determination is optional because it depends on the various types of tires a process may be used on. In this way, a process intended for processing a single type or a single family of tire models may not require this determination as the various constants used by the system will not change. Moreover, a well-developed system may be arranged to automatically account for or measure any parameters that are specific to a particular tire type and account for any changes automatically. Along these same lines, the process may further include an optional determination of the desired circumference of the finished casing. This target or programmed circumference (PC) of the casing will typically depend on the type of tire being processed and may be determined by the system based on the type of tire being processed or, alternatively, based on an input by the operator.

After the desired circumference of the casing has been determined, the original or current circumference (CC) of the tire is measured at 504. The measurement of the tire circumference, which includes the tread to be removed, may be measured by any appropriate mode of measurement, for example, by use of the rasp 118 or the measurement wheel 136 as discussed relative to FIG. 1, and represents a baseline dimension of the worn tire that is an indication of the amount of material that should be removed to achieve a desired casing dimension. In the case of the rasp 118, the rasp is moved closer to the axis of rotation until it contacts the tire and begins to rotate. The radial distance at which the rasp 118 begins to rotate may be equated to the outer circumference or radius of the tire to be processed. In one embodiment, such measurement may only be performed once before any cutting is performed on the tire. In other embodiments, the measurement may be taken multiple times or at different locations across the arch of the wheel from side to side. Thereafter, during the cutting operation, the circumference may be estimated based on the estimated amount of material removed from the tread portion of the tire substantially in real time. In alternative embodiments, however, the actual circumference of the tire may be monitored after each cutting pass, and the information thus acquired may be used in controlling subsequent cutting processes or, alternatively, in adjusting the accuracy of the material disposition estimations performed by the system.

Having determined the desired and actual dimensions of the tire casing, the system may optionally determine the amount of material that is required to be removed or buffed from the tire at 506. The determination at 506 is optional and may be based on the difference in diameter or circumferential length between the original dimension of the tire and the desired dimension of the casing that will result. The amount of material that should be removed, thus estimated, may be expressed in any suitable units, for example, volume, weight, mass, or it may alternatively be expressed as a thickness of a layer that should be removed from the outer portion of the tire. In alternative embodiments, the system may determine whether additional cuts should be performed or whether the target circumference has been reached by comparing the difference between the initial measured circumference and the desired circumference with an estimated thickness of material removed from the tire, which is reset for each tire and is incremented with each cutting pass on a particular tire.

Having determined the target parameters for processing the tire, the system determines whether the target circumference of the tire has been achieved or, stated differently, whether an amount of material requiring removal is still present on the tire at 508. As can be appreciated, the determination at 508 initiates the cutting process and causes successive cuts to be performed while material to be removed is present on the tire or casing.

When the system determines that material to be removed is present, a determination of the cutting depth is performed at 510, and a cut is performed at the predetermined cutting depth at 512. The cutting depth determined at 510 may represent the depth to which a rasp may be placed in contact with the outer portion of the tire. For example, as shown in FIGS. 1 and 2, the cutting depth is the depth relative to the outer circumference of the tire 102 at which the rasp 118 is placed by the rasp arm 122. When determining an appropriate cutting depth while the material to be removed is above a threshold, the system may advance the rasp in predetermined increments, for example, 0.069 inches (1.75 mm.). This incremental increase may be repeated for each cutting cycle or cutting pass while the material layer to be removed is at least equal to or greater than a threshold thickness.

When the remaining material layer to be removed is less than the threshold thickness, the system may determine an appropriate cutting depth that will provide one or more finishing cuts on the casing. In other words, the system may perform one or more final, finishing cut(s) that will yield the desired or target circumference of the casing. The depth of such finishing cuts is advantageously compensated based on the amount of material stored on the tire after one or more preceding cuts have been performed. Thus, in the preferred embodiment, the rasp is moved equal incremental distances from the original outer circumference or radius until it nears the target circumference or radius. The last pass, which often requires a cut to be performed at a depth that is less than the incremental depth increases, may still be greater than the distance that would equate to the final target circumference or radius. By moving to a cut that is deeper than necessary, the offset generated by the accumulated storage of rubber may be accounted for, and efficiency and greater accuracy may be obtained.

Following each cut, the system may estimate the amount of material stored by that cut at 514. As was previously described, the material stored refers to the layer of material that elastically recovers after the rasp has passed. Although the rasp is able to remove material from the outer portion of the tire due to the compressive force applied to the material under the rasp, this compressive force is inadequate to cause cutting of the material beyond a certain depth in a single pass. Thus, the outer portion of the material experiencing larger compressive forces is removed by the rasp, and an inner portion, which is still within the cutting depth of the rasp, is left on the tire.

The estimation of the amount of material stored on the tire in the illustrated example embodiment is performed based on the work done to remove the material that was removed from the tire. In one embodiment, this work may be compared with a theoretical work that would have been required to remove the entire layer of material encompassed by the cutting depth of the rasp. In the illustrated example embodiment, the work input to the cutter at each pass, i.e. the work required by the rasp to remove a certain amount of material from a tire, is correlated to the amount of material thus removed. This correlation, which can depend on a multitude of physical factors, can be determined experimentally for any given type or model of tire.

More specifically, the work input to the rasp during a single cutting pass may be determined by measurement of the current input to an electric motor driving the rasp. In one embodiment, the work input to the rasp during the cutting operation can be compared and expressed as a percentage of the total work that would have been required to remove the entire layer of material within the cutting depth. The percentage of actual work in relation to the total work in that embodiment can be then correlated to an amount of material that was removed by the measured work of the rasp. For example, if a pass of the rasp is determined to have consumed 40% of the work that would have been required to remove the entire layer of material within the cutting depth, the remaining 60% of the work represents the amount of material stored on the tire.

The system can further estimate the total amount of material stored on the tire, or the amount of material that still needs to be removed from the tire to achieve the target circumference at 516. The system calculates an incremental amount of material removed by each cut at 518. Having determined the incremental amount of material removed by each cut at 518, the system may integrate or calculate the aggregate material removed from each tire at 520, and return to the determination at 508. As stated above, the process-loop around the determination at 508 will repeat as long as material to be removed is present on the tire. After a final cut is performed and the system determines that the aggregate sum of all incremental material removal cuts is within a predetermined range of the target material removal, the determination at 508 will turn to an affirmative outcome and the process will continue with optional steps 522, 524 before terminating. In the illustrated example embodiment, optional step 522 includes a final measurement of the circumference of the casing to validate the circumference and flag the part as accepted when the circumference corresponds to the target value or reject the casing if the circumference is out of specification. The optional step 524 includes logging of various parameters of the casing in the machine for later retrieval and analysis by the operator.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A buffing machine for removing rubber from a tire casing to produce a predetermined target circumference on the casing, the buffing machine adapted to rotatably mount the tire casing onto a rim, the rim associated with a rim motor arranged to rotate the rim about a central axis, the buffing machine comprising:
 a cutting device including an electric motor and disposed on a moveable arm such that the cutting device is adapted to selectively engage the tire casing at several iterative cutting depths;
 a position sensor associated with the moveable arm and disposed to provide a position signal indicative of the position of the cutting device in a radial direction from the central axis about which the tire casing is rotatable, the buffing machine being configured to use said position signal to provide a circumference signal also being disposed to provide a circumference signal indicative of a circumference of the tire casing that is indicative of a radial distance between the central axis and an outer surface of the tire casing; and,
 an electronic controller connected to the position sensor and the cutting device, the electronic controller being programmed to:
  receive and process the position signal and the circumference signal,
  move the cutting device into contact with the tire casing at a respective cutting depth for each of several iterative cuts while receiving an electrical signal corresponding to an amount of electrical work that has been expended by the cutting device through each of the iterative cuts,
  estimate an amount of material removed from the tire casing through the iterative cuts based on the amount of electrical work,
  between each iterative cut, use the electrical signal corresponding to the amount of work expended by the cutting device during the previous cut to estimate an amount of material stored by the previous cut, the material stored resulting from a difference between a total amount of material made available for removal by moving to a cutting depth of the previous cut and an amount of material actually removed by the previous cut,
  determine a target outer dimension of the tire casing after buffing, such target outer dimension indicative of a desired distance from the central axis to the outer surface of the tire casing,
  determine an offset, based on the amount of material removed through the iterative cuts, for a final cut made on the tire casing to be retreaded, such offset being indicative of an amount of rubber not being removed by prior iterative cuts because of elastic recovery of a rubber material of the tire casing after the cutting device has passed over the rubber material; and
  perform the final cut on the tire casing where the offset is applied to adjust a radial position of the final cut so that it is nearer to the central axis than the target outer dimension, such offset yielding an achieved outer dimension of the tire casing that substantially corresponds to the target outer dimension.

2. The machine of claim 1, wherein the electronic controller is further programmed to estimate a wear state of the cutting device and further determine the offset based on the wear state of the cutting device.

3. The machine of claim 1, wherein the electronic controller is further programmed to estimate an amount of material to be removed from the tire based on an initial circumference of the casing.

4. The machine of claim 1, wherein the offset is determined based on a determination of the amount of electrical work that has been performed on the tire in substantially real time.

5. The machine of claim 1, wherein the acquired electrical signals corresponding to the amount of electrical work are parameters indicative of electrical power being consumed by the electric motor.

6. The machine of claim 5, wherein the acquired electrical signals corresponding to the amount of electrical work are measurements of an electric current being drawn by the electric motor.

7. The machine of claim 1, wherein the buffing machine is programmed to select each cutting depth used to remove rubber from the casing such that it is the lesser of a predetermined in-feed and the offset.

8. The machine of claim 1, wherein the buffing machine is programmed to perform a majority of the iterative cuts by changing a radial position of the cutting device an equal amount relative to the central axis.

* * * * *